US011822387B2

(12) United States Patent
Pelissier et al.

(10) Patent No.: US 11,822,387 B2
(45) Date of Patent: Nov. 21, 2023

(54) MAGNETIC COUPLING AND DE-COUPLING OF A TABLET INFORMATION HANDLING SYSTEM TO A STAND

(71) Applicant: Dell Products L.P., Round Rock, TX (US)

(72) Inventors: Gerald R. Pelissier, Mendham, NJ (US); Tzu-Chau Chen, Wenshan District (TW); Hsu-Feng Lee, Taipei (TW); Mark John Law, Singapore (SG); Benedict Tiong Chee Tay, Singapore (SG)

(73) Assignee: Dell Products L.P., Round Rock, TX (US)

( * ) Notice: Subject to any disclaimer, the term of this patent is extended or adjusted under 35 U.S.C. 154(b) by 70 days.

(21) Appl. No.: 17/706,974

(22) Filed: Mar. 29, 2022

(65) Prior Publication Data
US 2023/0315150 A1    Oct. 5, 2023

(51) Int. Cl.
*G06F 1/16*    (2006.01)
(52) U.S. Cl.
CPC ............ *G06F 1/1632* (2013.01); *G06F 1/166* (2013.01)
(58) Field of Classification Search
CPC ................................ G06F 1/1632; G06F 1/166
See application file for complete search history.

(56) References Cited

U.S. PATENT DOCUMENTS

| | | | |
|---|---|---|---|
| 8,796,989 B2* | 8/2014 | Lee ......................... | H02J 50/10 320/108 |
| 9,195,263 B2 | 11/2015 | Mack et al. | |
| 9,385,561 B2* | 7/2016 | Sayles ..................... | H02J 50/90 |
| 9,565,909 B2 | 2/2017 | Song et al. | |
| 10,251,287 B2 | 4/2019 | Rohrbach | |
| 10,381,884 B2* | 8/2019 | Shaw ...................... | H02J 50/90 |
| 11,239,710 B2* | 2/2022 | Gaule ..................... | H02J 50/10 |
| 2012/0146576 A1* | 6/2012 | Partovi ................. | H02J 7/0044 320/108 |
| 2015/0162767 A1* | 6/2015 | Oh ......................... | H04R 1/028 320/108 |
| 2018/0248406 A1* | 8/2018 | Bae ....................... | H02J 7/00 |
| 2019/0006893 A1* | 1/2019 | Shaw ..................... | H02J 50/10 |
| 2023/0152851 A1* | 5/2023 | Berliner .................. | G06F 3/14 361/679.41 |
| 2023/0171479 A1* | 6/2023 | Berliner ................. | H04N 23/51 348/54 |

* cited by examiner

*Primary Examiner* — Adrian S Wilson
(74) *Attorney, Agent, or Firm* — ZAGORIN CAVE LLP; Robert W. Holland (57) ABSTRACT

A tablet information handling system selectively couples to a charging stand and charging dock with opposing sets of spaced magnets to have magnetic attraction hold a wireless charging receiver aligned with a wireless charger. Magnetic attraction is greatest when the tablet information handling system couples in a landscape or portrait orientation and is reduced for removal of the tablet information handling system by rotating to an offset orientation so that magnets align with opposing spaces, resulting in a reduced magnetic attraction. A sensor disposed in a space detects the offset rotation by detecting the increased magnetic flux of the magnet aligning with the space so that a user interface can provide an end user with an indication that the tablet information handling system is positioned for separation from the charging stand or charging dock.

20 Claims, 8 Drawing Sheets

MAGNETIC COUPLING AND DE-COUPLING OF A TABLET INFORMATION HANDLING SYSTEM TO A STAND

BACKGROUND OF THE INVENTION

Field of the Invention

The present invention relates in general to the field of portable information handling systems, and more particularly to magnetic coupling and de-coupling of a tablet information handling system to a stand.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches, such as finger or stylus touches performed at a capacitive touch detection surface disposed over the display. Convertible configurations typically include multiple separate housing portions that couple to each other so that the system converts between closed and open positions. Such convertible systems typically include an integrated keyboard to accept end user keyed inputs and an integrated touchpad to accept end user pointer inputs similar to a mouse. Although convertible systems tend to have more heavy and bulky housings than tablet systems, end users generally prefer convertible systems where the system is used to make typed inputs. Conventionally, end users tend to select tablet information handling systems when the system is used to consume content, such as web browsing. The light weight and simple planar housing provide a system that is convenient to use, including sharing content with others, such as by passing the system between end users.

One option for performing inputs at a tablet information handling system is to write the inputs to the touchscreen display with a finger or stylus. Improvements to touch screen resolution and the accuracy of stylus active writing tips has helped to make handwritten inputs a viable alternative to keyboard typed inputs. Further, increased processing capabilities included with tablet systems have improved the speed and accuracy for translation of handwritten inputs into digital form at a tablet information handling system. For instance, as an end user writes notes onto a tablet touchscreen display, an application executing on the tablet translates letters and words into digital content that is saved so that an end user can interact with the content using a keyboard. One advantage to this approach is that a group of individuals can share one tablet information handling system to collaborate, such as during a meeting. To achieve effective collaboration, applications executing on the tablet information handling system augment collaboration by supporting notetaking, whiteboarding and interactions with other nearby information handling systems, such as an end user's desktop or convertible information handling system.

One way to improve sharing of a portable information handling system is to have the system operate without any cables connected, such as for power or communication. Typically, tablet information handling systems include a battery to power the system when not connected to external power, however, the battery is often recharged with external power provided through a cable. Using a cable can result in less convenience for the end user who has to insert the cable into a port when the battery charge is depleted. Another alternative is to charge the battery with a wireless charger that provides charge through a rear side of the tablet information handling system having a wireless charger receiver. The wireless charger generally communicates power through an alternating current and near field effects, which generally require close proximity between the wireless charger and wireless charger receiver. In an environment having sharing of a system between multiple users, placement of the tablet information handling system on a wireless charger can tend to restrict access to the tablet information handling system until sufficient charge is available. Even if a tablet information handling system is accessible to end users while charging on a wireless charger, pressing against the touchscreen display to perform an input can disrupt charging by moving the tablet system relative to the charger. One option is to couple the tablet information handling system to the wireless charger with magnetic attraction. A difficulty with this approach is that a substantial magnetic force is needed to keep the tablet information handling system sufficiently attached to withstand touch inputs at the touchscreen without separating from the wireless charger, yet not have an overwhelming magnetic attraction so that separation of the tablet system from the wireless charger requires excessive force.

SUMMARY OF THE INVENTION

Therefore, a need has arisen for a system and method which magnetically couples and decouples a tablet information handling system at a wireless charger.

In accordance with the present invention, a system and method are provided which substantially reduce the disadvantages and problems associated with previous methods and systems for coupling and decoupling a tablet information handling system at a wireless charger. Opposing sets of magnets in a portable information handling system and wireless charger housing, such as a vertical charging stand and/or horizontal desktop charging stand, align for an increased magnetic attraction when in a portrait or landscape orientation, and align partially with spaces when offset from the portrait or landscape orientations for a decreased magnetic attraction that aids in separation of the tablet information handling system.

More specifically, a tablet information handling system has a processor and memory disposed in a planar housing that cooperate to execute instructions that process information. A battery included in the planar housing provides power to the processor and memory with a charge provided from a wireless charging receiver disposed at a rear side of the planar housing. A set of spaced magnets disposed around the wireless charging receiver magnetically attracts the planar housing to a charger housing having a wireless charger, such as a vertical charging stand that holds the tablet information handling system in a viewing position and a desktop charging stand having a horizontal configuration that holds the tablet information handling system in a writing position. The wireless charger housing includes a set of spaced magnets to align with the spaced magnets of the tablet information handling system and hold the wireless charger and wireless charging receiver in position for exchanging a charge. The vertical charging stand has a C-shape of magnets with a single space. The desktop charging dock has a circular shape of magnets with plural spaces. The tablet information handling system has magnets of opposing polarity position in a circular shape with plural spaces symmetrically positioned relative to the desktop charging dock. In a landscape or portrait orientation, a maximum magnetic attraction is provided to secure the tablet information handling system to the charging housing. When offset by rotation from the landscape and portrait orientations, a reduced magnetic attraction is provided so that the tablet separates more readily from the charging housing as at least some magnets align with spaces instead of opposing polarity magnets. A Hall sensor disposed in a space detects increased magnetic flux in the offset orientation as an opposing magnet aligns with the space by rotation, thus allow an indication at a user interface to an end user of a reduced separation force for removal of the tablet information handling system from the wireless charger housing.

The present invention provides a number of important technical advantages. One example of an important technical advantage is that a tablet information handling system securely couples to a wireless charger to maintain a charging relationship and limit movement during touch inputs, yet readily decouples from the wireless charger when desired by an end user. Magnetic attraction is selectively reduced by an end user by rotating the tablet information handling system relative to the wireless charger to partially misalign opposing polarity magnets of the tablet information handling system and the wireless charger. The tablet information handling system couples to either of a vertical charging stand or a desktop charging dock with magnetic attraction of sufficient strength to offer a firm writing surface for an end user at the touchscreen display, yet releases with a rotation of the tablet information handling system relative to the wireless charger that reduces magnetic attraction for a reduced separation force. A sensor detects the magnetic attraction, such as by the relative rotational orientation of the tablet information handling system and wireless charger, to provide notice to an end user of the reduced magnetic attraction for separation of the tablet information handling system.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A tablet information handling system couples by magnetic attraction to a vertical charging stand and desktop charging dock with opposing spaced magnets so that rotation of the tablet information handling system to an orientation offset from portrait or landscape results in a reduced magnetic attraction for decoupling of the tablet information handling system from the vertical charging stand and desktop charging dock. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1A:
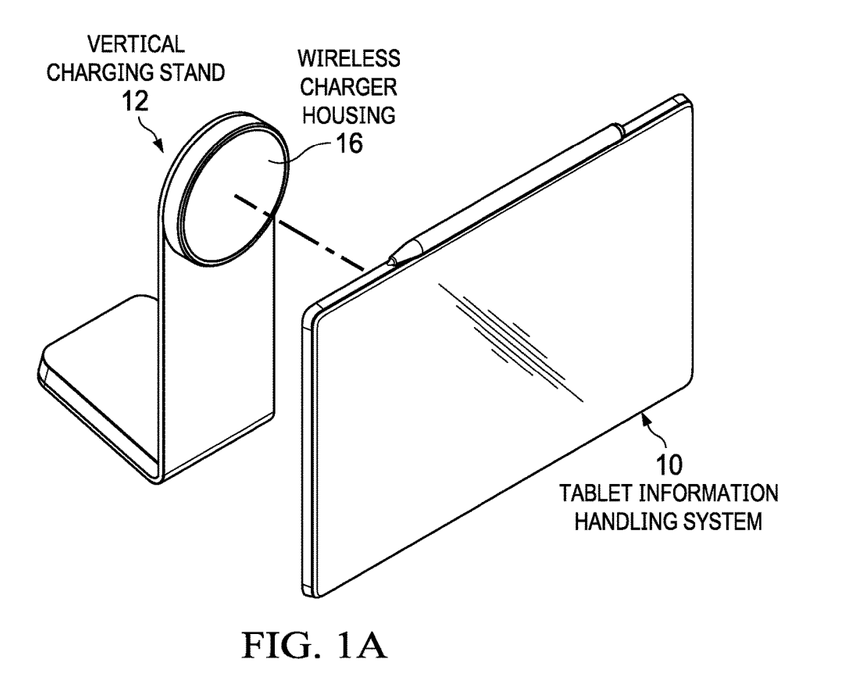
FIGS. 1A and 1B depict coupling by magnetic attraction of a tablet information handling system to a vertical charging stand and a horizontal desktop charging dock.
Figure 1B:
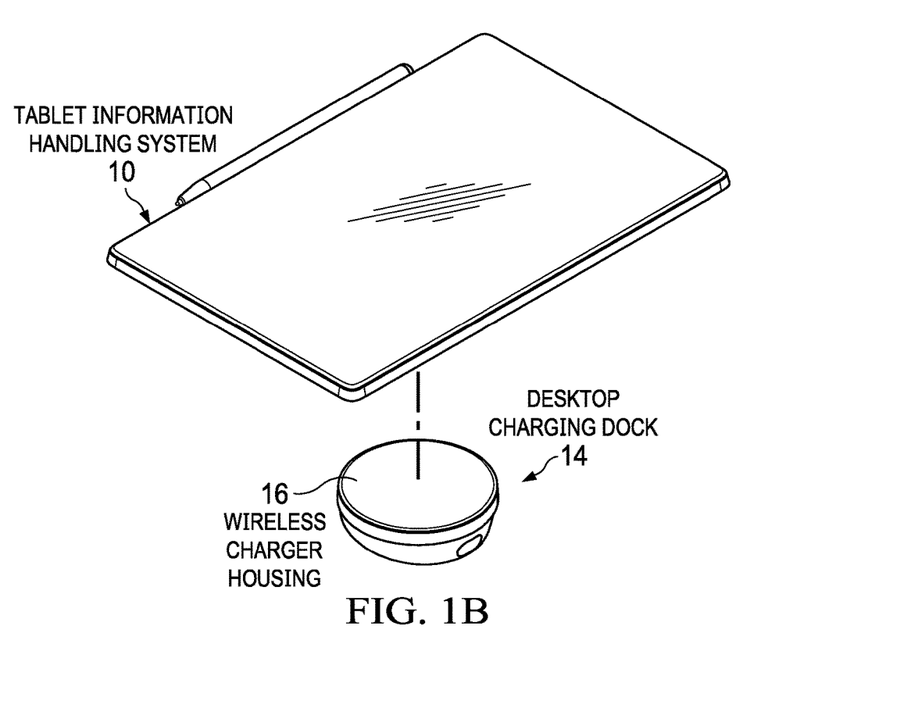

Referring now to FIGS. 1A and 1B, coupling by magnetic attraction is depicted of a tablet information handling system 10 to a vertical charging stand 12 and a horizontal desktop charging dock 14. FIG. 1A depicts a vertical charging stand 12 having wireless charger housing 16 held in a vertically raised position and including a set of spaced magnets to attract magnets at a rear side of tablet information handling system 10 to hold a display in the front face of tablet information handling system 10 in a viewing position. An opposing set of spaced magnets in the rear side of tablet information handling system 10 securely couples to the set of spaced magnets in wireless charger housing 16 to align a wireless charging receiver in tablet information handling system 10 with a wireless charger of vertical charging stand 12 so that a wireless charge efficiently passes. FIG. 1B depicts a horizontal desktop charging dock 14 with a wireless charger housing 16 having a set of spaced magnets to couple to the rear side of tablet information handling system 10. As with vertical charging stand 12, desktop charging dock 14 provides opposing magnetic attraction to align the wireless charger and wireless charging receiver. Desktop charging dock 14 holds tablet information handling system 10 in a raised position with a slight tilt to horizontal to provide a writing platform on the touchscreen display.

The magnetic attraction available from vertical charging stand 12 and desktop charging dock 14 is significant enough to hold tablet information handling system 10 in place, even during written inputs by a stylus or finger, without moving tablet information handling system 10 from the charging position. In some work sharing environments, a charging tablet information handling system may have increased forces working against the magnetic attraction as it is passed between different end users who write on the touchscreen display. Vertical charging stand 12 may have slightly greater magnetic attraction to help overcome the downward force of gravity operating against tablet information handling system 10 in the raised position. A difficulty with the large magnetic attraction forces is that an end user will have to apply as substantial of a separation force to pull tablet information handling system 10 away from vertical charging stand 12 and desktop charging dock 14 when use in a separated configuration is desired. To aid in selectively reducing the magnetic attraction, each opposing set of spaced magnets when rotated slightly relative to each other aligns a magnet with an opposing space so that the total magnetic attraction is reduced and a reduced separation force may be used to pull tablet information handling system 10 away from the wireless charger. In the example embodiment, a landscape and portrait orientation of tablet information handling system 10 each has the maximal magnetic attraction while a rotation of tablet information handling system 10 to an orientation offset for landscape and portrait orientations offers the reduced magnetic attraction for separation of tablet information handling system 10.

Figure 2:
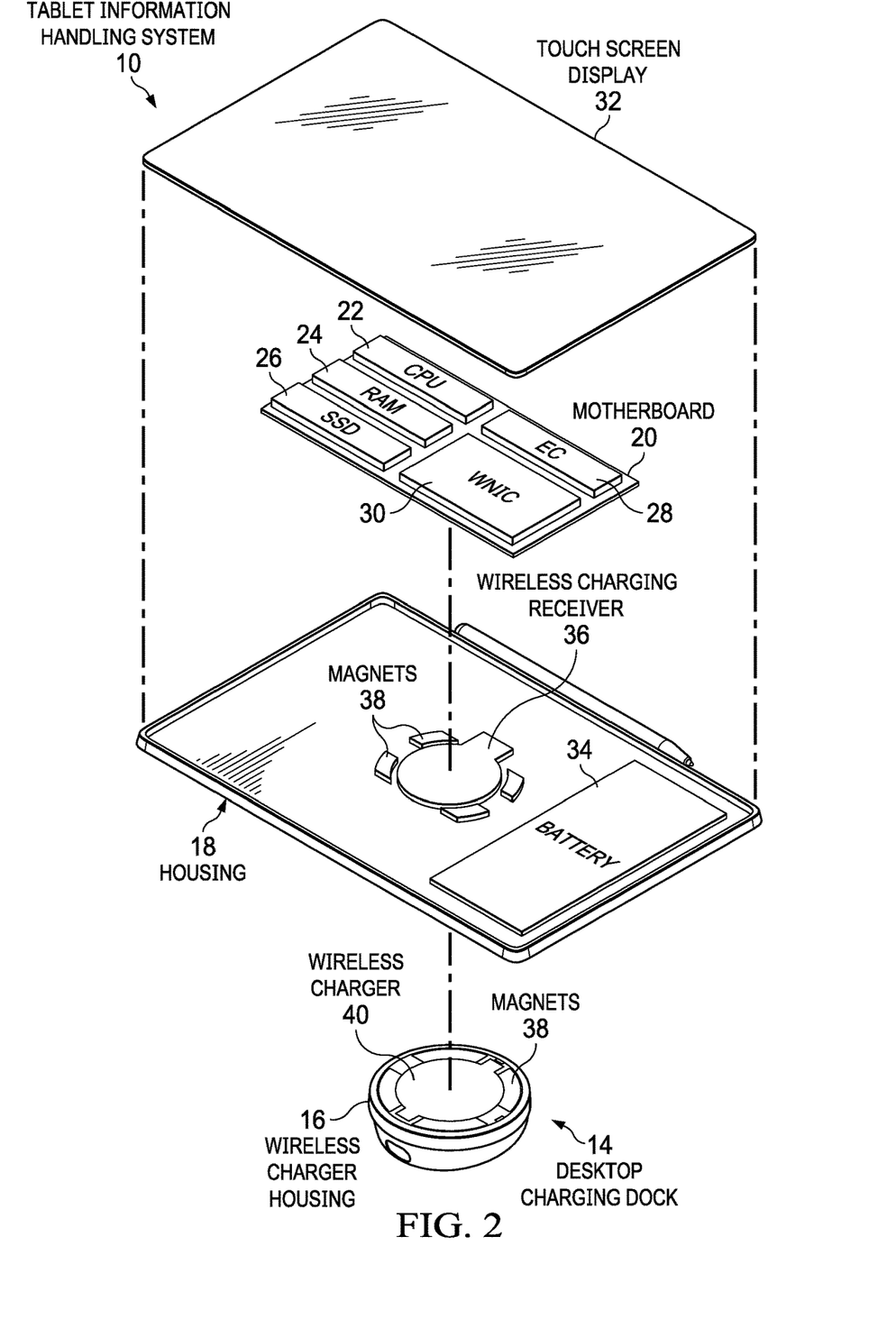
FIG. 2 depicts an exploded upper perspective view a tablet information handling system aligned to couple to a desktop charging dock.

Referring now to FIG. 2, an exploded upper perspective view depicts a tablet information handling system 10 aligned to couple to a desktop charging dock 14. In the example embodiment, tablet information handling system 10 processes information with processing components built into a portable housing 18 having a planar configuration. In alternative embodiments, other types of housings may be used to support different types of portable information handling systems, such as convertible systems. A motherboard 20 supports communication between the processing components, such as with a integrated wirelines. A central processing unit (CPU) 22 executes instructions, such as an operating system and applications, to process information in cooperating with a random access memory (RAM) 24 that stores the instructions and information. A solid state drive (SSD) 26 provides persistent storage with non-transitory memory to store the instructions and information during power down periods of time. An embedded controller 28 manages operation of physical components of tablet information handling system 10, such as application of power and interactions with input/output (I/O) devices. A wireless network interface controller (WNIC) 30 supports wireless communications with external networks and devices, such as through WiFi and Bluetooth. A touchscreen display 32 couples to housing 18 over the processing components and includes a capacitive touch detection surface to detect end user touch inputs. A battery 34 disposed in housing 18 stores a charge to power the processing components. A wireless charging receiver 36 coupled at a central location of housing 18 receives power through a wireless transmission to charge battery 34. In the example embodiment a wireless charger 40 including in wireless charger housing 16 transmits the power, such as with near field effects. Desktop charging dock 14 couples to the bottom surface of housing 18 aligned to pass power to wireless charging receiver 36 by opposing magnets 38, such as with magnetic attraction promoted by opposing magnet polarity. As described in greater depth below, a set of spaced magnets 38 are used to help manage the amount of magnetic force generated for selective removal of tablet information handling system 10 from desktop charging dock 14 when the alignment of opposing magnets and spaces are adjusted.

Figure 3A:
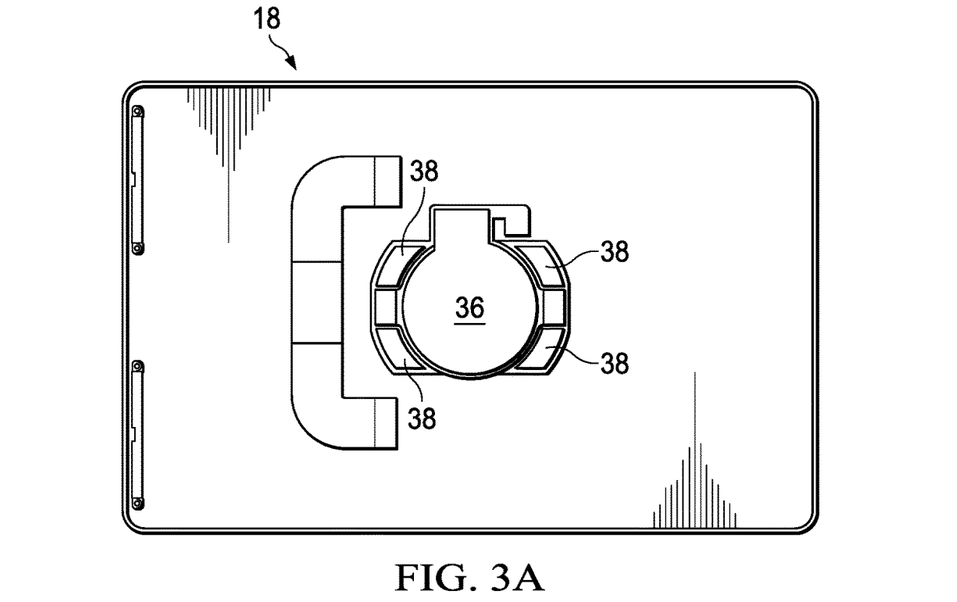
FIGS. 3A, 3B and 3C depict a wireless charging receiver in a tablet information handling system configured to accept charge wirelessly from a wireless charger of a vertical charging stand and a horizontal desktop charging dock.
Figure 3B:
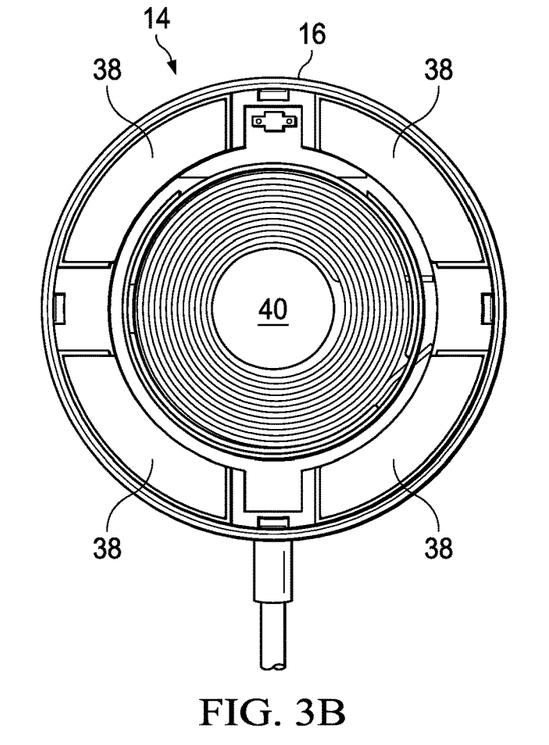
Figure 3C:
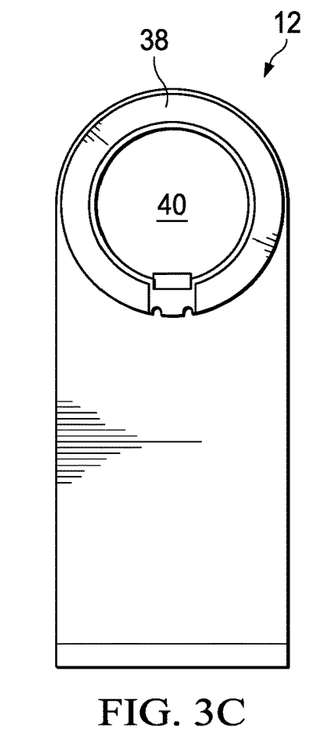

Referring now to FIGS. 3A, 3B and 3C, a wireless charging receiver 36 in a tablet information handling system 10 configured to accept charge wirelessly from a wireless charger 40 of a vertical charging stand 12 and a horizontal desktop charging dock 14 is depicted. FIG. 3A depicts wireless charging receiver 36 in a central location of housing 18 with a set of spaced magnets 38 disposed around wireless charging receiver 36. In the example embodiment, four magnets 38 are disposed in a circular shape around wireless charging receiver 36 with a space located between each magnet 38. FIG. 3B depicts a set of spaced magnets 38 disposed in a circular shape around wireless charger 40 of desktop charging dock 14 with a space between each magnet 38. Tablet information handling system 10 and desktop charging dock 14 have a symmetrical disposition of magnets 38 locations in the circular shape, although the magnets of desktop charging dock 14 have a greater size that takes up more of the circumference of the circular shape. The magnet 38 of vertical charging stand 12 has a C-shape of a circle with a single space. The larger magnet size of vertical charging stand 12 provides a greater magnetic attraction than that of desktop charging to help support tablet information handling system 10 in a raised position. The space between the magnet, when aligned with an opposing magnet of tablet information handling system 10, as opposed to a magnet, reduces the overall magnetic attraction when separation of tablet information handling system 10 is desired. Desktop charging dock 14 with four spaces provides a greater reduction of magnetic attraction at rotation to an offset orientation, as describe below. In the example embodiment, the spaces and magnets at all rotational orientations will maintain some overlap of opposing magnets so that some magnetic attraction remains at all offset orientations to keep the tablet information handling system attracted to the wireless charger housing and prevent an unexpected release that could damage the system.

Figure 4A:
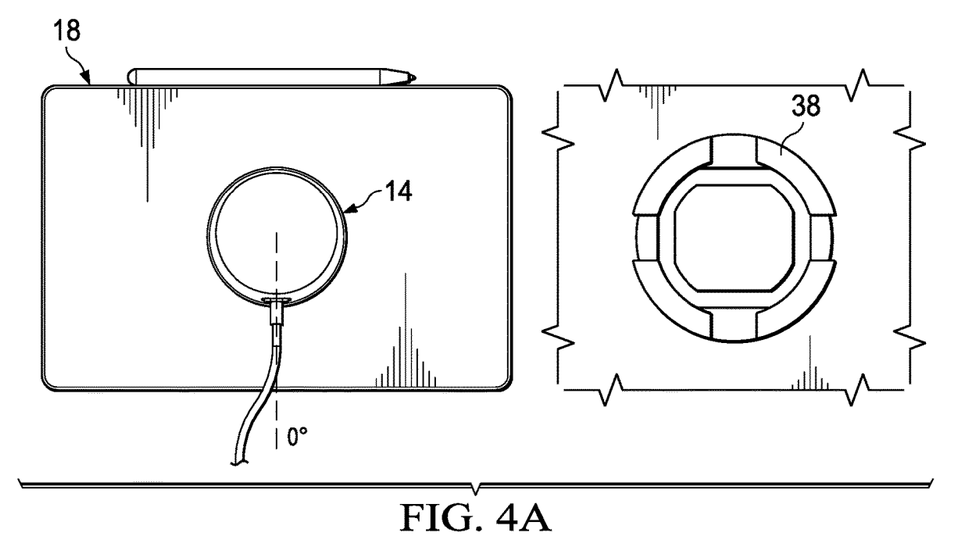
FIGS. 4A, 4B and 4C depict a rear view of a tablet information handling system coupled to a horizontal desktop charging dock with high and reduced magnetic attraction.
Figure 4B:
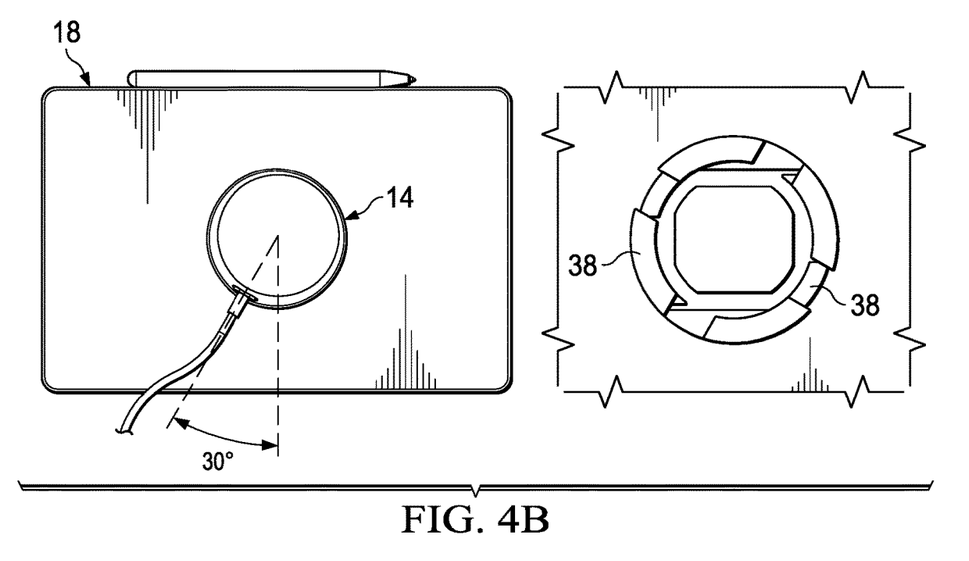
Figure 4C:
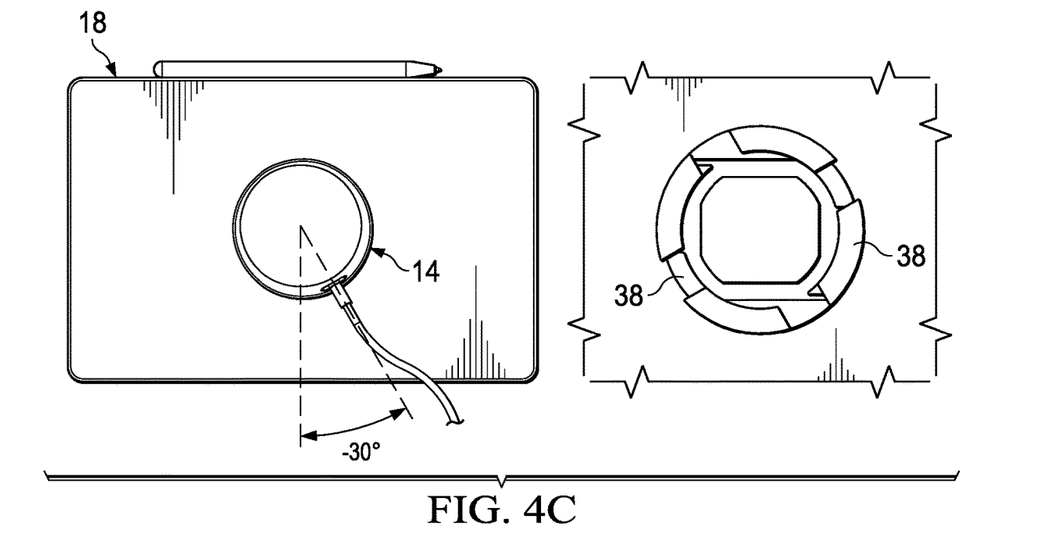

Referring now to FIGS. 4A, 4B and 4C, a rear view depicts a tablet information handling system 10 coupled to a horizontal desktop charging dock 14 with high and reduced magnetic attraction. FIG. 4A depicts desktop charging dock 14 coupled in a landscape orientation having magnets 38 fully aligned, as shown by the cutaway view to the right of the rear view. The symmetric location of magnets 38 and spaces in tablet information handling system 10 and desktop charging dock 14 provides a direct alignment of magnets 38 in both the landscape and portrait orientations with a maximal magnetic attraction. FIG. 4B depicts a 30 degree rotation of desktop charging dock 14 to the left relative to tablet information handling system 10; and FIG. 4C depicts a 30 degree rotation to the right. The cutaway view on the right side of FIGS. 4B and 4C depict that rotation of desktop charging dock 14 aligns magnets with opposing spaces instead of opposing magnets, thereby reducing overall magnetic attraction so that separation of tablet information handling system 10 from desktop charging dock 14 takes less force than when magnets and spaces align as in FIG. 4A. Although magnetic force is reduced by misalignment from the rotation, some overlap of opposing magnets remains throughout 360 degrees of rotation so that tablet information handling system 10 is maintained in place until a separation force is applied.

Figure 5A:
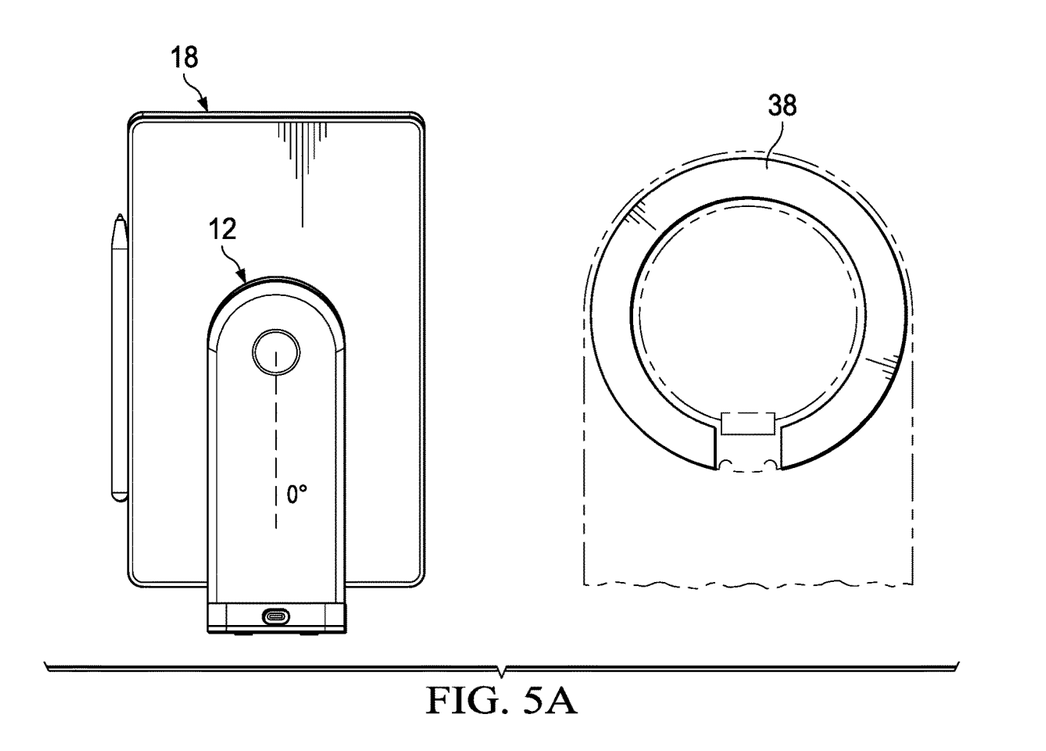
FIGS. 5A, 5B and 5C depict a rear view of a tablet information handling system coupled to a vertical charging stand with high and reduced magnetic attraction.
Figure 5B:
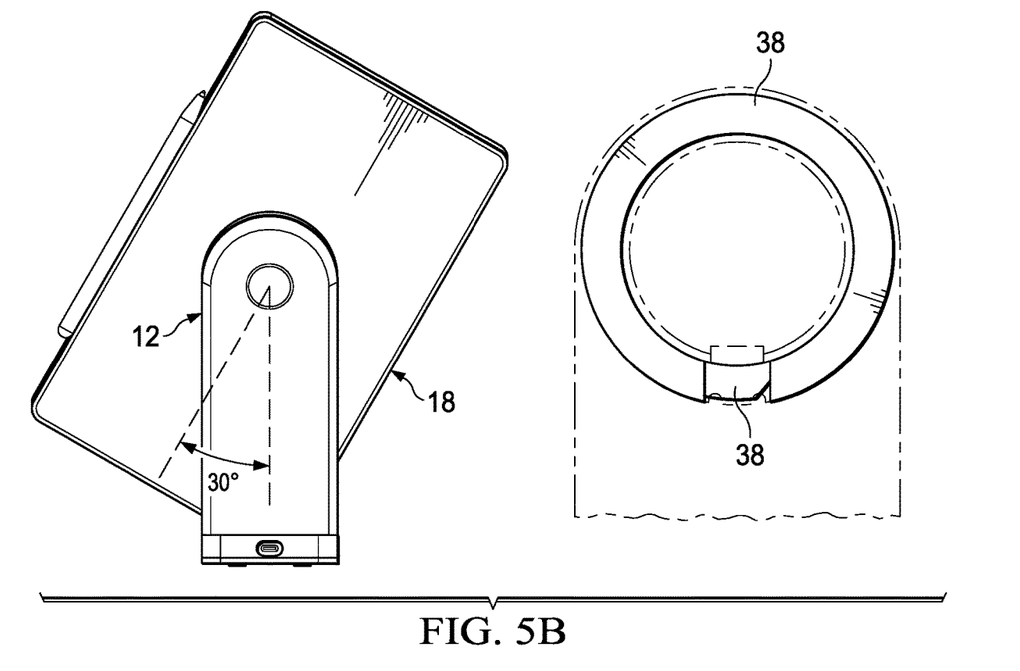
Figure 5C:
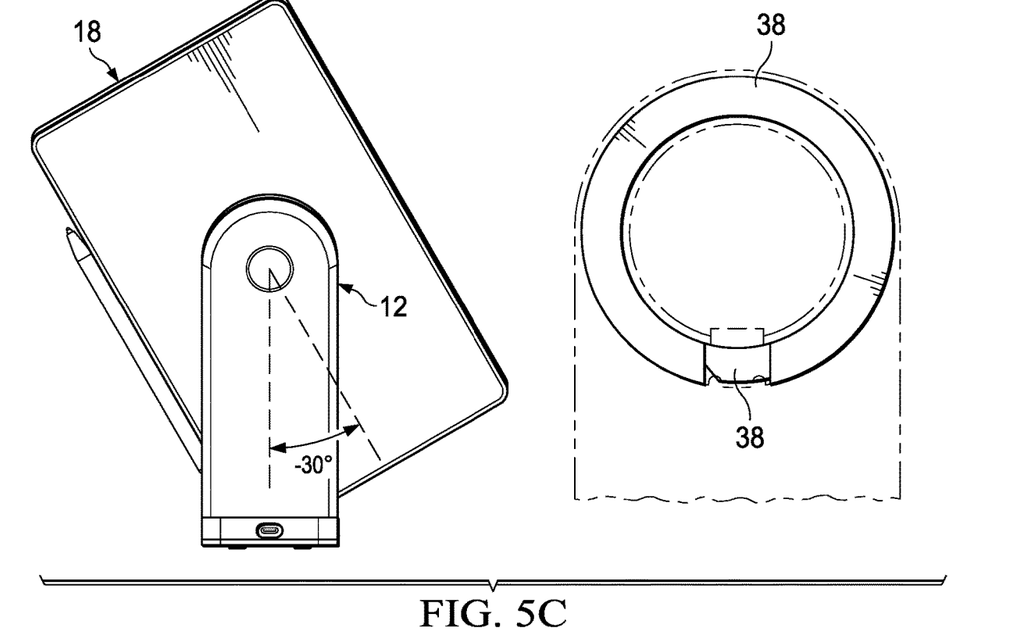

Referring now to FIGS. 5A, 5B and 5C, a rear view depicts a tablet information handling system coupled to a vertical charging stand with high and reduced magnetic attraction. FIG. 5A depicts tablet information handling system 10 coupled to vertical charging stand 12 in a portrait orientation. The C-shapes magnet has a bottom space depicted in the cutaway view that aligns with a space of the set of spaced magnets of tablet information handling system 10 so that a maximal magnetic attraction is available to couple tablet information handling system 10 in a vertical raised position. FIG. 5B depicts a 30 degree rotation of vertical charging stand 12 to the left relative to tablet information handling system 10; and FIG. 5C depicts a 30 degree rotation to the right. The cutaway view on the right side of FIGS. 5B and 5C depict that rotation of tablet information handling system 10 relative to vertical charging stand 12 aligns a portion of the C-shaped magnet 38 with an opposing space instead of opposing magnet and the space in the C-shape magnet with an opposing magnet, thereby reducing overall magnetic attraction so that separation of tablet information handling system 10 from vertical charging stand 12 takes less force than when magnets and spaces align as in FIG. 5A. In the example embodiment, a landscape orientation of tablet information handling system 10 on vertical charging stand 12 has substantially the same magnetic attraction as the depicted portrait orientation with the space in the C-shape magnet aligned with a space of the tablet information handling system magnets.

Figure 6A:
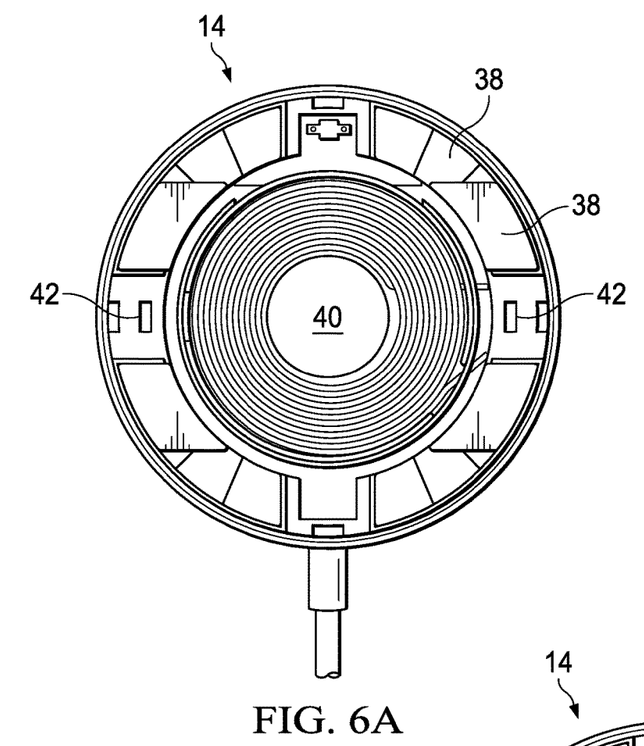
FIGS. 6A, 6B and 6C depict changes in orientation of a magnet relative to a sensor in a space of a set of spaced magnets to detect a separation rotational orientation.
Figure 6B:
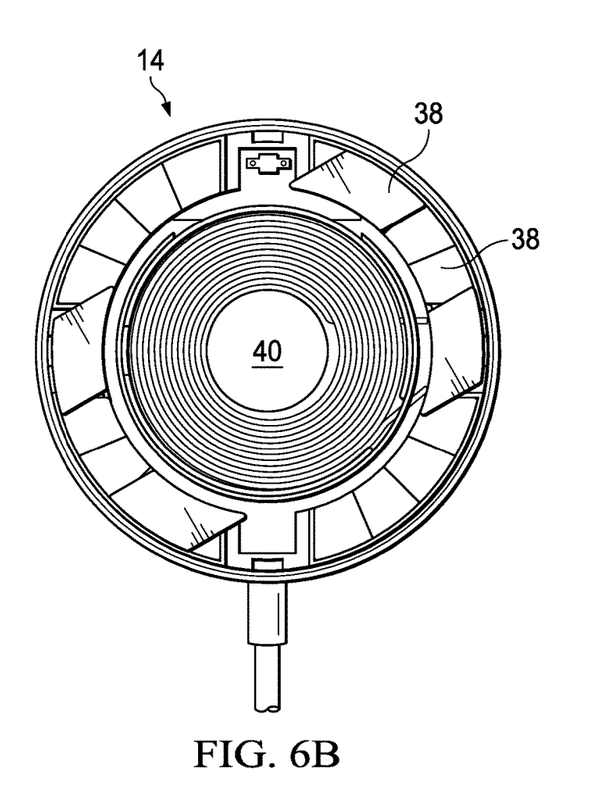
Figure 6C:
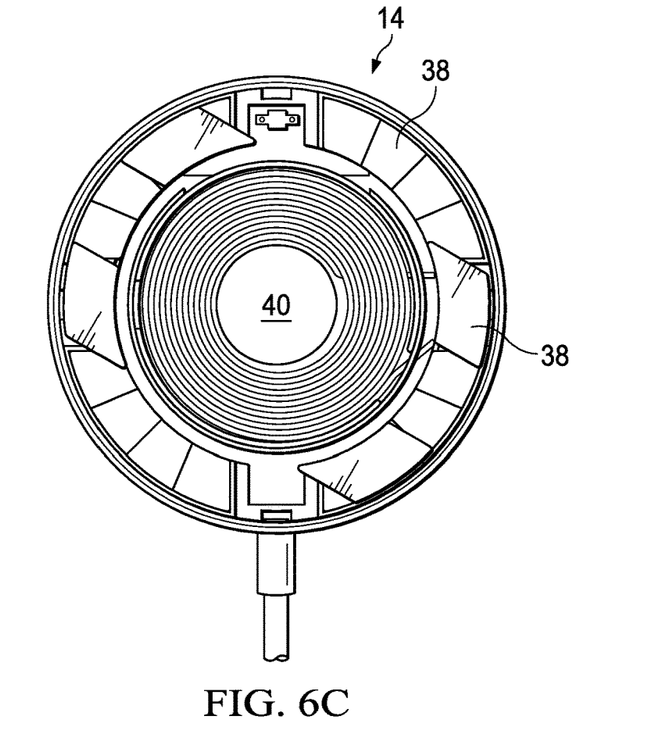

Referring now to FIGS. 6A, 6B and 6C, depict changes of orientation of a magnet 38 relative to a Hall sensor 42 in a space of a set of spaced magnets to detect a separation rotational orientation. FIG. 6A depicts desktop charging dock 14 with a central wireless charger 40 coupled to a tablet information handling system so that spaces of the opposing sets of spaced magnets align and the opposing magnets create a maximal magnetic attraction. FIG. 6B depicts a rotation of desktop charging dock by 30 degrees to the right relative to the tablet information handling system; FIG. 6C depicts a rotation of 30 degrees to the left. When desktop charging dock 14 rotates offset to the landscape and portrait orientations of the tablet information handling system, Hall sensor 42 disposed in a space between magnets of the tablet information handling system aligns with a magnet of desktop charging dock 14 and senses the increased magnetic flux to detect the offset orientation as an indication of a reduced magnetic attraction. When an increased magnetic flux is detected, a variety of actions may be done to support separation of tablet information handling system. For example, the end user may be provided with an audible or visual indication that the tablet information handling system is in an offset orientation suitable for separation from the desktop charging dock or vertical charging stand. In other embodiments that have magnets with variable magnetic flux, Hall sensor 42 may be used to adjust the magnetic attraction. For example, current from the charging source may be used to power an electromagnet and cut off when the offset orientation is detected to further decrease the magnetic attraction. As another example, an electropermanent magnet may have the magnetic attraction shut "off" when the offset orientation is detected. In another alternative embodiment, a reversal of magnetic polarity may be commanded at one or more magnets to aid in separation of the tablet information handling system, such as by reversing the current of an electromagnet.

Figure 7:
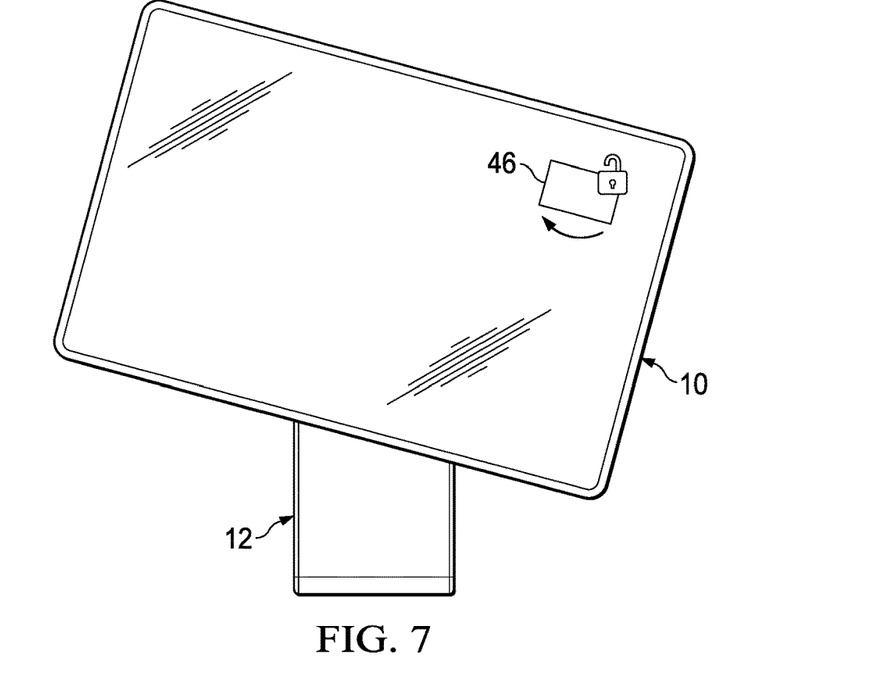
FIG. 7 depicts a user interface presented to an end user when the tablet information handling system has an orientation offset from landscape and portrait orientations with reduced magnetic attraction for separation of the tablet information handling system from the wireless charger housing.

Referring now to FIG. 7, a user interface 46 is presented to an end user when the tablet information handling system has an orientation offset from landscape and portrait orientations with reduced magnetic attraction for separation of the tablet information handling system from the wireless charger housing. For example, when the Hall sensor of FIG. 6A detects alignment with a magnet, user interface 46 is presented at the display of tablet information handling system 10 so that the end user can pull on tablet information handling system 10 to separate it from vertical charging stand 12. In the example embodiment, tablet information handling system 10 is in an offset orientation rotated slightly from the landscape orientation. The end user may continue rotation to the portrait orientation at which the magnetic attraction is again increased so that the user interface is removed from the visual presentation at the display of tablet information handling system 10.

Although the present invention has been described in detail, it should be understood that various changes, substitutions and alterations can be made hereto without departing from the spirit and scope of the invention as defined by the appended claims.

What is claimed is:

1. An information handling system comprising:
   a portable housing;
   a processor disposed in the portable housing and operable to execute instructions to process information;
   a memory disposed in the portable housing and interfaced with the processor, the memory operable to store the instructions and information;
   a display coupled to a first side of the portable housing and interfaced with the processor, the display operable to present the information as visual images;
   a wireless charging receiver disposed in the portable housing at a second side opposite the display;
   a first set of plural spaced magnets coupled to the portable housing at the second side; and
   a wireless charger disposed in a charger housing separate from the portable housing, the charger housing having a second set of spaced magnets, the first and second sets of magnets aligned at a first predetermined orientation to provide a first magnetic attraction, the portable housing rotating relative to the charger housing to a second predetermined orientation to align spaces with magnets of the first and second set of opposing magnets to provide a second magnetic attraction of less than the first magnetic attraction, at least some of the first and second sets of magnets aligned throughout the rotating of the portable housing relative to the charger housing through 360 degrees of rotation.

2. The information handling system of claim 1 further comprising:
   a sensor disposed in the portable housing and operable to detect the second predetermine orientation; and a user interface presented at the display to indicate alignment associated with separation of the portable housing from the charger housing.

3. The information handling system of claim 2 wherein the sensor comprises a Hall sensor disposed in a space of the first set of spaced magnets and aligned with a magnet of the second set of spaced magnets in the second predetermined orientation.

4. The information handling system of claim 1 wherein:
the first set of spaced magnets are disposed in a circular shape around the wireless charging receiver; and
the second set of spaced magnets are disposed in a circular shape around the wireless charger so that at least a first space of the first set of spaced magnets aligns with a first space of the second set of spaced magnets.

5. The information handling system of claim 4 wherein the first and second sets of spaced magnets have symmetrical space locations.

6. The information handling system of claim 4 wherein the second set of spaced magnets have a C-shape with one space.

7. The information handling system of claim 1 further comprising:
a first charger housing having the wireless charger disposed in a vertically raised stand position; and
a second charger housing having the wireless charger disposed in a desktop charging dock position.

8. The information handling system of claim 1 wherein:
the first charger housing second set of magnets have a C-shape with one space; and
the second charger housing second set of magnets have a circular shape with plural spaces.

9. The information handling system of claim 8 wherein the second set of spaced magnets have a greater surface area of magnets and a smaller surface area of space than the first set of spaced magnets.

10. A method for coupling a portable information handling system to a wireless charger, the method comprising:
aligning a first set of plural spaced magnets included in the portable information handling system with a second set of plural spaced magnets included in a charger housing of the wireless charger to hold the wireless charger in proximity to a wireless charging receiver of the portable information handling system; and
rotating the portable information handling system relative to the charger housing to partially align a magnet of the first set of spaced magnets with a space of the second set of spaced magnets to reduce magnetic attraction coupling the portable information handling system to the charger housing.

11. The method of claim 10 further comprising:
sensing increased magnetic flux in a space of the first set spaced magnets related to the rotating; and
in response to the sensing, presenting a user interface at the portable information handling system to pull to separate the portable information handling system from the charger housing.

12. The method of claim 10 further comprising:
coupling the charger housing to a stand aligned to hold the portable information handling system in a vertical viewing position;
arranging the first and second sets of spaced magnets to provide a first magnetic attraction when the portable information handling system is in a landscape orientation and a portrait orientation; and
partially aligning the magnet of the first set of spaced magnets with the space of the second set spaced magnets only when the portable information handling system rotates to an orientation between the landscape and portrait orientations.

13. The method of claim 12 further comprising:
arranging the second set of spaced magnets around the wireless charger in a C-shape with one space at a bottom of the wireless charger.

14. The method of claim 12 further comprising:
coupling the charger housing to a desktop dock to hold the portable information handling system in a writing position;
arranging the first and second sets of spaced magnets to provide a first magnetic attraction when the portable information handling system is in a landscape orientation and a portrait orientation; and
partially aligning the magnet of the first set of spaced magnets with the space of the second set of spaced magnets only when the portable information handling system rotates to an orientation between the landscape and portrait orientations.

15. The method of claim 14 further comprising:
arranging the first and second set of spaced magnets to have symmetrical locations for plural magnets and plural spaces in each of the first and second sets of spaced magnets.

16. The method of claim 15 wherein at least some of the magnets of the first set of spaced magnets remained aligned with at least some of the magnets of the second set of spaced magnets when the portable information handling system rotates through 360 degrees relative to the wireless charger housing.

17. A system for coupling a portable information handling system to a wireless charger stand, the system comprising:
a charging stand having a vertically configured wireless charger and a first set of spaced magnets;
a desktop charging dock having a horizontally configured wireless charger and a second set of spaced magnets;
a wireless charging receiver configured to couple to the portable information handling system; and
a third set of spaced magnets configured to couple to the information handling system to selectively align the wireless charging receiver with each of the vertically configured wireless charger and the horizontally configured wireless charger, the third set of spaced magnets positioned to interact with each of the first and second sets of spaced magnets to have a first predetermined magnetic attraction when the portable information handling system is in a landscape or portrait orientation and a second predetermined magnetic attraction when the portable information handling system rotates to an offset orientation of between the landscape and portrait orientations.

18. The system of claim 17 wherein:
the first set of spaced magnets have a C-shape and one space;
the second set of spaced magnets have a circular shape and plural spaces; and
the third set of spaced magnets have the circular shape and the plural spaces symmetrical in location to the second set of spaced magnets.

19. The system of claim 18 further comprising a sensor disposed in at least one of the plural spaces of the third set of spaced magnets and operable to detect a change in alignment with a magnet of the first and second sets of spaced magnets associated with the offset orientation.

20. The system of claim 19 wherein at least some of the magnets of the third set of spaced magnets remain aligned with at least some of the magnets of the first and second set of magnets when the portable information handling system rotates through 360 degrees relative to the charging stand and the desktop charging dock.

\* \* \* \* \*